United States Patent
Rodrigo

(10) Patent No.: US 7,212,970 B2
(45) Date of Patent: May 1, 2007

(54) METHOD AND SYSTEM OF CONFIGURING A SPEECH RECOGNITION SYSTEM

(75) Inventor: Anthony Rodrigo, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/809,808

(22) Filed: Mar. 16, 2001

(65) Prior Publication Data

US 2001/0047258 A1   Nov. 29, 2001

Related U.S. Application Data

(63) Continuation of application No. PCT/EP98/06030, filed on Sep. 22, 1998.

(51) Int. Cl.
*G10L 21/00* (2006.01)
(52) U.S. Cl. .................... 704/275; 704/270.1
(58) Field of Classification Search ............ 704/231, 704/235, 251, 275, 270.1, 270; 379/88.01, 379/88.13, 88.17, 88.22
See application file for complete search history.

(56) References Cited

U.S. PATENT DOCUMENTS

| | | | |
|---|---|---|---|
| 5,251,233 A | 10/1993 | Labedz et al. | |
| 5,303,263 A | 4/1994 | Shoji et al. | |
| 5,325,402 A | 6/1994 | Ushirokawa | |
| 6,269,336 B1 * | 7/2001 | Ladd et al. | 704/270 |
| 6,282,511 B1 | 8/2001 | Mayer | |

FOREIGN PATENT DOCUMENTS

| | | | |
|---|---|---|---|
| EP | 0 382 670 | | 8/1990 |
| EP | 0 747 881 | | 12/1996 |
| EP | 0793359 A2 | | 9/1997 |
| EP | 0 854 417 | | 7/1998 |
| JP | 2000-76040 | | 3/2000 |
| WO | WO 98/08215 | * | 2/1998 |

OTHER PUBLICATIONS

Christer Erlandson and Per Ocklind, "WAP-The wireless application protocol", Ericsson Review, No. 4, 1998, pp. 150-153.
"WAP Architecture—Wireless Application Protocol Architecture Specification", Wireless Application Protocol Forum, Ltd., Version 30, XP-002101098, Apr. 1998.

* cited by examiner

*Primary Examiner*—Angela Armstrong
(74) *Attorney, Agent, or Firm*—Squire, Sanders & Dempsey L.L.P.

(57) ABSTRACT

A speech control system and method are provided in which state definition information is loaded from a network application server. The state definition information defines possible states of the network application server and is used to determine a set of valid commands of the network application server. A validity of a text command obtained by converting an input speech command can be checked by comparing the text command with the determined set of valid commands. Thus, a transmission of erroneous text commands to the network application server can be prevented so as to reduce total processing time and response delays.

20 Claims, 3 Drawing Sheets

METHOD AND SYSTEM OF CONFIGURING A SPEECH RECOGNITION SYSTEM

This application is a continuation of international application serial number PCT/EP98/06030, filed 22 Sep. 1998.

FIELD OF THE INVENTION

The present invention relates to a speech control system and method for a telecommunication network, wherein a network application server is controlled on the basis of a speech command.

BACKGROUND OF THE INVENTION

In distributed speech recognition (DSR) systems, the user may control an application on the basis of spoken control messages supplied to an automatic speech recognition (ASR) means or engine. The spoken control messages are converted by the ASR engine into text commands which are sent to the application running in a corresponding network application server (NAS) or to a subscriber terminal like a mobile station (MS) from which the spoken control messages have been received.

The basic function of a distributed speech recognition system in the context of mobile applications is the ability of a mobile station to provide automatic speech recognition features with the help of a high power ASR engine or ASR server provided in the network. Therefore, the basic function of the mobile station is the transmission of an input speech command to this network ASR engine to perform the recognition tasks and return the results. The result can be a recognized word or command in text format. The mobile station can then use the text to perform the necessary functions.

Another function of such a system is to provide the mobile station with access to other application servers, i.e. Internet WWW (World Wide Web), email, voice mail and the like, via speech commands. Therefore, the user with such a type of mobile station is able to connect to these application servers and issue speech commands. To achieve this, the mobile station transmits a speech signal (audio) to the ASR engine. The ASR engine will perform speech recognition so as to obtain corresponding text commands. These text commands are returned to the mobile station. The mobile station then uses these text commands to control a corresponding network application server (NSA) which can be any server in a data network like the Internet that provides various services like WWW, email readers, voice mail and so on.

Since the ASR engine usually runs on a platform that can also run other applications or perform other tasks, it is possible to transfer other functions to the ASR engine, such as processing the obtained text command to ascertain the required operation and contact the relevant server. Then, it transmits the information retrieved from the contacted network application server back to the mobile station. In this situation, the mobile station receives a speech input, sends it to a network ASR engine which performs speech recognition, executes necessary functions based on the speech commands and sends the retrieved information or results to the mobile station.

In the following, examples for the above cases are described:

EXAMPLE 1

The user might say "Call John Smith". In this case, the ASR engine converts the speech into text and returns the text "Call John Smith" to the mobile station, where the application software in the mobile station then retrieves the number for John Smith and performs a calling operation.

EXAMPLE 2

The speech command at the mobile station might be "Racing Info". In this case, the ASR engine converts the speech into text, and returns the text "Racing Info" to the mobile station. Thus, the application software of the mobile station recognizes that the user wishes to access the network server that provides a Horse Racing Information. Accordingly, the mobile station establishes a connection with the relevant server, retrieves the latest race results and displays the results on a display of the mobile station.

EXAMPLE 3

A speech command input to the mobile station might be "Read Email". In this case, the ASR engine converts the speech into text and returns the text "Read Email" to the mobile station. Thus, the application of software of the mobile station recognizes that the user wishes to access the network server that provides access to the user's email box. In this case, the mobile station sends a command to the ASR engine to establish a connection with the relevant email application server. Now, the ASR engine does not return the recognized speech, but further processes the converted speech. In case the speech command was "Message 1", the ASR engine receives the speech and translates it into a text command "Message 1" and transmits this text command to the email application server. In turn, the email application server returns the text of Message 1 to the ASR engine. The ASR engine will then transmit this text to the mobile station. The dialog may continue with Message 2, 3 and so on, wherein each speech command from the user will be handled by the ASR engine, until the user issues an exit command or until a message is received from the mobile station to terminate the session.

In the above examples 1 and 2, the only function of the ASR engine is to convert speech into text and to send the results back to the mobile station for further processing. Therefore, the network application servers will receive commands directly from the mobile station. However, in the above example 3, the ASR engine itself processes the converted speech and directly accesses the relevant network application server in order to receive the results from the network application server and pass the results back to the mobile station.

Thus, the mobile station or the ASR engine is required to communicate with the network application server to issue user commands to the network application server and receive responses from the network application server.

However, the following problem is encountered in either one of the cases. It is assumed that the email application to be read supports commands such as A {Message 1, Message 2 ... Message N and Exit} at the top level menu. In case the user is already reading a message, the commands in this context are B {Delete, Exit, Next Message}. Therefore, if the user is in the top level menu and inputs a speech command other than those in the command set A, the network application server will respond with an error message. Even if the user issues a speech command from the command set B, this command will still be an erroneous command, since the context or state of the network application server is different.

Moreover, context irrelevant commands could as well be input into the mobile station due to noise and the like. All of these speech signals will be converted into a text by the ASR engine and sent to the network application server which will respond with error messages.

As such scenarios may occur frequently, the processing of valid commands by the network application server will be delayed, since valuable network band widths and application server processor time is required for responding to such invalid commands.

Moreover, the above problem leads to a delay in the response of the ASR engine to an input speech message, since it has to wait for responses from the network application server.

Accordingly, the overall response time at the mobile station will be increased such that the user may repeat the command or change the command which increases the delays even further and leads to a poor performance of the system.

SUMMARY OF THE INVENTION

It is an object of the present invention to provide a speech control system and method having a reduced overall response time.

This object is achieved by a speech control system for a telecommunication network, comprising:
loading means for loading a state definition information from a network application server, wherein said state definition information defines possible states of the network application server;
determining means for determining a set of valid commands for said network application server on the basis of said state definition information; and
checking means for checking a validity of a text command, obtained by converting an input speech command to be used for controlling said network application server, by comparing said text command with said determined set of valid commands.

Furthermore, the above object is achieved by a speech control method for a telecommunication network, comprising the steps of:
loading a state definition information from a network application server, wherein said state definition information defines possible states of the network application server;
determining a set of valid commands for said network application server on the basis of said state definition information; and
checking a validity of a text command, obtained by converting a speech command to be used for controlling said network application server, by comparing said text command with said determined set of valid commands.

Accordingly, since a set of valid commands can be determined on the basis of a state definition information provided by the network application server, the validity of an obtained text command can be checked before transmitting the text command to the network application server. Thus, the transmission of erroneous text messages can be prevented so as to prevent corresponding delays and wastes of processing time of the network application server.

Preferably, the loading means can be arranged to load a grammar and/or vocabulary information which specifies a total set of valid commands supported by the network application server, wherein the determining means can be arranged to determine said set of valid commands on the basis of said total set of valid commands and a state transition information included in said state definition information.

Thereby, the speech control system can keep up with the actual states of the network application server by referring to state transition rules so as to limit the total set of valid commands to those commands which correspond to the actual state of the network application server.

Alternatively, the determining means can be arranged to cause the loading means to load a state-dependent grammar file defining a set of valid commands for a specific state of the network application server, when the determining means determines a state change on the basis of a state transition information included in the state definition information.

Thus, only the set of valid commands applicable to a particular state of the network application server is loaded by referring to the state transition information. Thereby, accuracy can be improved and network connections can be used more efficiently.

Preferably, the network control system may comprise a speech recognition means for converting an input speech command received from a subscriber terminal into the text command to be supplied to the network application server. Thus, a central speech control system can be provided in the network which can be accessed by individual subscriber terminals.

In case a Wireless Application Protocol (WAP) is used in a mobile network, the speech control system may be implemented in a Wireless Telephony Application (WTA) server, wherein the WTA server may be arranged to receive the text command from a network speech recognition means for converting an input speech command received from a subscriber terminal into said text command. Thereby, existing WTA applications can be enhanced with an optimized speech recognition.

As an alternative, the speech control system may be a subscriber terminal having an input means for inputting a speech command, a transmission means for transmitting the speech command to a speech recognition means of the telecommunication network, and a receiving means for receiving the text command from the speech recognition means, wherein the transmitting means is arranged to transmit the received text command to the network application server.

Thus, the validity check of the received text command is performed in the subscriber terminal, e.g. the mobile station, before it is transmitted to the network application server. Hence, the processing time at the network application server can be reduced, as it will receive only valid commands.

The state definition information can be a data file such as a Wireless Markup Language (WML) file or a Hyper Text Markup Language (HTML) file. This data file can be sent online to the speech control system as a part of the standard information sent by the network application server.

Furthermore, the state definition information may include a load instruction for loading the state-dependent grammar and/or vocabulary file. Thereby, the speech control system may use the load instruction directly for loading the specific set of valid commands in case a change of the state of the network application server is determined.

Preferably, the state definition information can be provided by the network application server at a setup time of the server.

Furthermore, the state definition information can be stored together with a command set info in a network server running on the hardware of the speech control system.

Preferably, the speech control system may comprise a plurality of vendor-specific speech recognition means, wherein corresponding parameters for said plurality of vendor-specific speech recognition means are defined in the state definition information. Thereby, a universal speech control system can be obtained which is based on a hardware and software independent platform. Thus, a required audio processing hardware and vendor-specific speech recognition means can be selected depending on the network application server.

Further preferred developments of the present invention are defined in the dependent claims.

BRIEF DESCRIPTION OF THE DRAWINGS

In the following, the invention will be described in greater detail on the basis of a preferred embodiment with references to the accompanying drawings, wherein.

DESCRIPTION OF THE PREFERRED EMBODIMENT

Figure 1:
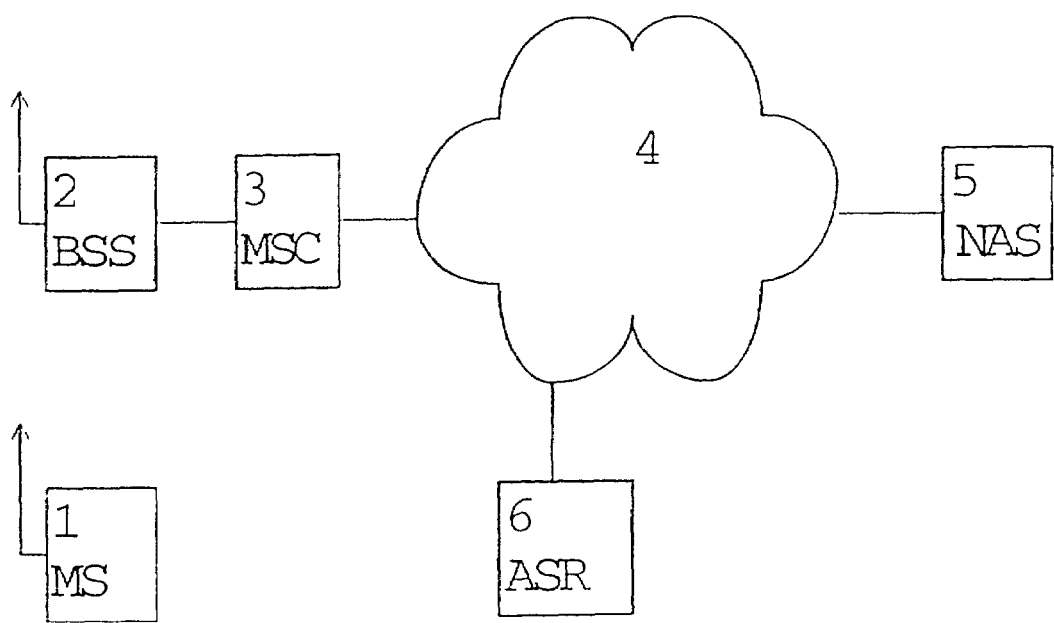
FIG. 1 shows a block diagram of a telecommunication network comprising a speech control system according to the preferred embodiment of the present invention.

A block diagram of a telecommunication network comprising the speech control system according to the preferred embodiment of the present invention is shown in FIG. 1. According to FIG. 1, a mobile station (MS) 1 is radio-connected to a base station subsystem (BSS) 2 which is connected to a telecommunication network 4 via a mobile switching center (MSC) 3. The telecommunication network 4 may be a data network like the Internet which provides various services.

Furthermore, a network application server (NAS) 5 is connected to the network 4 in order to provide a specific service on the basis of corresponding commands. Additionally, an automatic speech recognition means or engine (ASR) 6 is provided as a central means for enabling speech input at subscriber terminals like the mobile station 1.

To refine the recognition process and arrive at recognition rates with higher accuracy, language specific features are employed in the ASR engine 6. To achieve a high accuracy of the speech recognition, the application has to be fine-tuned to a required context. This is done by specifying a vocabulary for the application and grammars that are valid in the context of the application. The vocabulary is basically a set of words to be recognized by the ASR engine 6, e.g. words like Close, Read, Message, Orange, Pen, Chair, Exit, Open etc. . . . . . In the ASR engine 6, a means for specifying the grammar for a given application can be provided. This could be achieved by a rule-based grammar like for example:

public <Command>=[<Polite>] <Action><Object> (and <Object>)*;
<Action>=Read|Next|delete;
<Object>=message|item;
<Polite>=Please;

In the above rule-based grammar, one public rule, <Command>, is specified, which may be spoken by a user. The rule is a combination of subrules <Action>, <Object> and <Polite>, wherein the square brackets around <Polite> indicate an optionality thereof. Therefore, the above grammar would support the following commands: "read message", "please read item and message" etc. . . . .

In command-based ASR applications, rule-based grammars are used to define all spoken input which the application is programmed to handle. The rule-based grammar basically specifies all spoken commands (or command syntax) that are supported by an application. In case of an email reader, the grammar file contains all commands which the email reader application will accept (e.g. Message 1, Message 2, . . . , Message N, Exit, Delete and Next Message).

The ASR engine 6 generally loads the associated grammar file before starting the speech recognition. Some applications may even have multiple grammar files to define different contexts of an application such as the network application server 5, wherein the ASR engine 6 is required to load the context-dependent grammar file at run time.

In the preferred embodiment, a grammar file, a vocabulary file and an application states definition file (ASD file) are defined. Therefore, each network application server 5 produces an ASD file, a grammar file and/or a vocabulary file. The grammar file is adapted to the requirements of the ASR engine 6, wherein ASR engines 6 of different vendors may have different grammar file formats.

The ASD file is a file which describes all possible states of the application and how to jump between states, along with the valid commands for each state. Thus, the ASD file provides a means for specifying the context-dependent grammar files and also a vocabulary file name. This is an important feature, since a given application may use different grammars and/or vocabularies depending on the context. If this information is loaded on-line to the ASR engine 6, the speech recognition and the overall response time can be improved remarkably due to the small set of valid commands and the resulting high recognition accuracy.

In case the ASD file is based on a syntax similar to HTML (Hyper Text Markup Language), it could be defined as follows:

<ASD>
<APP="Email Reader">
<STATE="Main Menu", COMMANDS=<MSG>, NEXTSTATE="Read", <QUIT>, NEXTSTATE="">;
<STATE="Read", COMMANDS=<NXT>, NEXTSTATE="Read", <PREV>, NEXTSTATE="Read", <QUIT>, NEXTSTATE="Main Menu">;

⋮

⋮

<GRAMMAR>
<MSG>=MESSAGE<DIGITS>
<NXT>=NEXT
<PREV>=PREVIOUS
<QUIT>=EXIT
<DIGITS>=1|2|3|4|5;

⋮

⋮

</GRAMMAR>
</APP>
</ASD> wherein an <ASD> tag identifies the file as a file type that provides the state definition of the network application server 5, an <APP> tag specifies that application name and a <STATE> tag defines a given state, i.e. the name of the state, the valid commands for this state, and with each command, the next state to which the application must jump is also defined. Such a <STATE> tag is defined for each state of the network application. The <GRAMMAR> tag provides a means of defining the commands and the syntax of the commands.

According to the above file, the application has to jump to the state "Read" after the Messages 1, 2, 3 . . . N. The <digits> tag defines a specific grammar. In the present case, the <GRAMMAR> tag shows that the digits could be 1, 2, 3, 4 or 5. After the command "Exit" the application should be exit (which is denoted as a NULL state ("")). It is to be noted that the state is to be transferred to the "Main Menu", when an "Exit" command is issued in the "Read" state.

Figure 2:
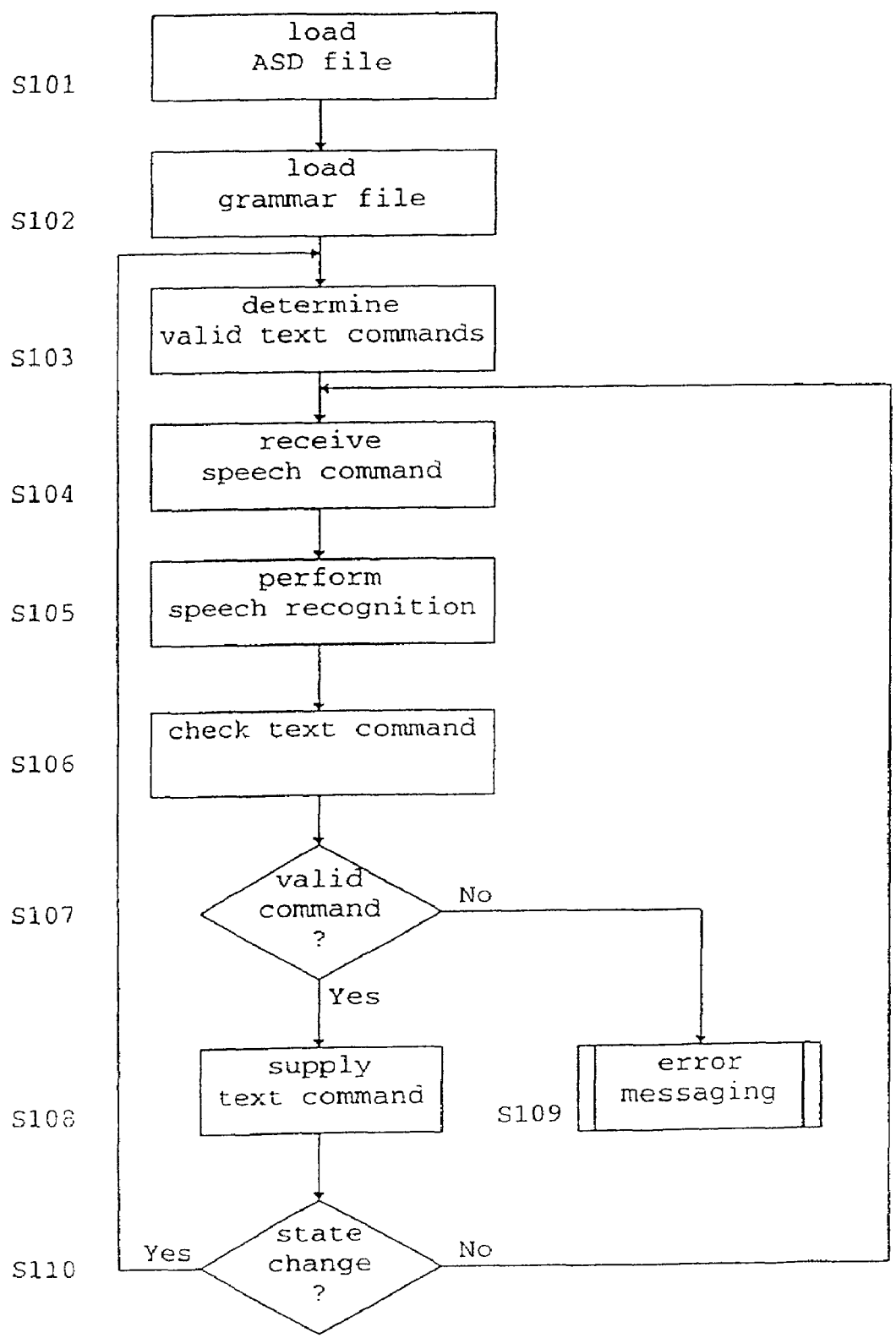
FIG. 2 shows a flow diagram of a speech control method according to the preferred embodiment of the present invention.

Using this approach, the ASD file tells the ASR engine 6 or the mobile station 1 which commands are valid for a given context. In order for the mobile station 1 or the ASR engine 6 to keep up with the states of the network application server 5, state transition rules are also provided in the ASD file. Using other tags which include a context-dependent grammar file, it would be possible to instruct the ASR engine 6 which grammar or vocabulary file is to be loaded. Thereby, a higher flexibility can be provided and a recognition can be made more accurate, since the ASR engine 6 is fine-tuned to the context of the network application server. An example for such a tag is shown in the following:

<STATE="Read" LOADGRAMMAR="URL=ftp://hs.gh-.com/Reademail.gmr"
 LOADVOCABULARY="URL=ftp://hs.gh.com/Read-email.vcb"
COMMANDS="Next", NEXTSTATE="Read", <PREV>, NEXTSTATE="Read", <QUIT>, NEXTSTATE="Main Menu">;

FIG. 2 shows a flow diagram of an example for a speech recognition processing as performed in the preferred embodiment.

Initially, the ASR engine 6 loads a corresponding ASD file from the network application server 5 to be connected (S101). In the loaded ASD file, the ASR engine is instructed to load a state-dependent grammar file, i.e. "Read Email.gmr", when the network application server 5 enters the state "Read". Alternatively, the ASR engine 6 may load a general grammar file from the network application server 5 (S102).

Based on the grammar file, valid text commands for speech recognition are then determined (S103). In case of a state-dependent grammar file, the commands defined in the loaded grammar file are determined as valid commands for the speech recognition. In case of a general grammar file, the valid commands are selected from the general grammar file in accordance with a corresponding information provided in the ASD file. Accordingly, only the determined valid commands are allowed in this state or at least until a different grammar file is loaded.

Thereafter, a speech command is received from the mobile station 1 (S104) and speech recognition is performed for the received speech command (S105). The text command derived by the speech recognition processing from the received speech command are then checked against the determined valid text commands (S106).

In case of a valid command is determined in step 107, the text command is supplied directly to the network application server 5 or to the mobile station 1 (S108). Otherwise, an error messaging is performed so as to inform the mobile station 1 of the erroneous speech command (S109).

Thereafter, the ASR engine 6 refers to the state transition rules defined in the ASD file and determines whether the supplied command loads to a state change of the network application server 5 (S110). If no state change has been determined, the processing returns to step S104 in order receive another speech command and perform speech recognition of the other received speech commands, if required.

If a state change has been determined, the processing returns to step 103 and the ASR engine 6 refers to the ASD file so as to determine a new set of valid text commands. This can be achieved either by loading a new state-dependent grammar file according to an instruction provided in the ASD file, or by selecting new valid commands from the general grammar file based on a corresponding information in the ASD file. Subsequently, a new speech command is received in step 104 and speech recognition is continued in step 105.

An important aspect is that it is necessary for DSR type applications to have a standard method of passing application specific features to the ASR engine 6, since the ASR engine 6 is a general purpose ASR resource and any network application should be able to use the ASR features by producing state definition and grammar files. Therefore, according to the preferred embodiment, the ASR engine 6 can load a new grammar file at run time. This means that the ASR engine 6 can be instructed to load only the grammar rules applicable to a particular state/context of the network application server 5 by referring to the ASD file. This greatly improves recognition accuracy and efficiency of the use of the network connections.

An implementation of the network application server 5 and its user interface may vary depending on the software and hardware platform used. Most network application servers 5 may provide a HTTP interface (i.e. HTML), a WAP (Wireless Application Protocol—WML) or a proprietary Application Interface (API). If the ASD file is adapted to either WML (Wireless Markup Language) or HTML (Hyper Text Markup Language), it can be used as a universal definition file for application states or speech commands in any type of application running on a network application server 5. Using this ASD information, the ASR engine 6 would be able to build an internal representation of the relevant NAS application. This representation or model can then be used to keep the ASR engine 6 in synchronism with the application states of the network application server 5.

Hence, each network application server 5 which provides a speech recognition feature will have its speech-specific WML card(s) or HTML location. As an example, for a dailynews service, the state definition information URL (Uniform Resource Locator) might be a file such as: //services.internal.net/dailynews/speechsettings Therefore, the speech control system, whether it is in the mobile station 1 or in a network server, needs to load this file from the given URL.

Furthermore, if the network application server 5 is actually a HTTP or WAP origin server, then the first WML card or HTML page sent by this server can include the above specific URL under a special tag. Thereby, the mobile station 1 can be informed that this application supports a speech control and that the file at this URL needs to be loaded in order to provide the speech recognition facility.

Thus, the ASD files could be sent on-line to the ASR engine 6, as a part of the standard HTML/WML scripts sent by the network application server 5. The ASR engine 6 would interpret these scripts automatically and keep step with the network application server 5 so as to process the speech commands efficiently and perform functions such as on-line loading of grammar files and so on. In this case ASR engine 6 would directly refer to the URL specified in the LOADGRAMMAR tag so as to read the associated grammar file.

For other non-WML/HTML applications of the network application server 5, the ASD files are supplied by the network application server 5 to the ASR engine 6 at setup time, i.e. off-line. These ASD files must be produced in line with the HTML-like specification described above and will be stored along with a grammar file in a WWW server (e.g. www.asr.com) running on the hardware of the ASR engine 6.

At the beginning of an interaction between the ASR engine 6 and the network application server 5, the ASR engine 6 first loads the ASD file from the server www.asr.com and builds the internal state representation/model of the application of the network application server 5. Thereafter, the ASR engine can keep step with the states of the network application server 5 and processes speech commands efficiently and performs functions such as run-time loading of grammar files. In this case, the LOADGRAMMAR tag includes the full URL which points to the www.asr.com.

If the application of the network application server 5 is for example a "voice mail server" with an apparatus name vmsvr, then the following URL would be used for example: "http://www.asr.com/vmsvr/Grammar/vmail.gmr"

The above applications were based on the use of a single ASR engine 6 in the network 4. Therein, the ASR engine 6 is implemented on fixed hardware and software platforms. From the mobile station application's point of view, this universal ASR engine 6 handles the ASR requests and responds with the corresponding text commands.

However, in case the ASR engine 6 is based on a hardware and software independent platform such as Java with the JSAPI (Java speech APT, i.e. a standard API which is under development at present and provides a common API to ASR engines of disparate vendors), the functions of the ASD file can be extended even further. In this case, a flexibility of selecting a required audio processing hardware and a vendor-specific ASR engine 6 in dependence on the application of the network application server 5 can be provided. This means, that a logical ASR engine can be connected to the vendor-specific physical ASR engine 6 based on the application requirements of the network application server 5, such that even custom hardware can be used for audio processing. The corresponding optional parameters can be defined in the ASD file using additional tags.

Figure 3:
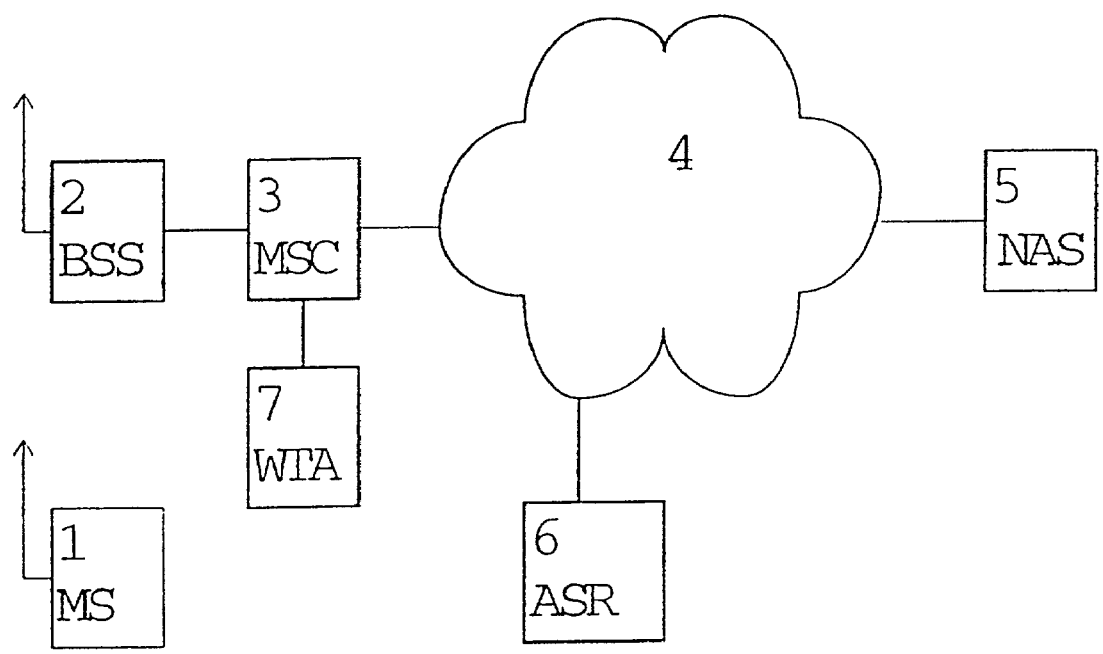
FIG. 3 shows a block diagram of a telecommunication network comprising a WAP-based speech control system according to the preferred embodiment of the present invention.

In the following, an example of an implementation of the ASD file in a WAP application is described, which may be used by operations to enhance their existing service offerings. In the previous examples, the ASD file was used by the ASR server or engine 6 in order to perform a context-based speech recognition. In this example, as shown in FIG. 3, the ASD file is used by a different application server, i.e. the WTA (Wireless Telephony Application) server 7 in WAP, to perform similar tasks. In this case, the use of WAP-enabled mobile phones or stations 1 is assumed.

The WAP-enabled mobile station 1 may have the full WAP stack installed and runs the WAE (Wireless Application Environment). The WTA server 7 has the ability to control the services of the network 4, which is a standard mobile network in the present case. The WTA server 7 acts as a principle content generator. The content may be customized and downloaded to the client, which is the mobile station 1 running a WAP software. The WTA server 7 could also perform call control functions such as informing the mobile station 1 of incoming call details via WTA events.

Furthermore, a network-based ASR server 6 is provided which enables an application to connect to the speech server based on parameters such as ID/address of the application, MSISDN, speech encoding type, grammar file ID (to select an appropriate grammar rule) and other optional parameters. Moreover, the ASR server 6 may have the ability to perform an outgoing call to a given MSISDN number, wherein the ASR server 6 extracts the received audio input having a PCM, CEP or other format, supplies the audio input to a speech recognition engine and obtains the recognized text, and sends the text to the ID/address of the calling application. The WTA server 7 then checks the validity of the text and may also control the ASR server 6 to load grammar files etc. . . . . .

Each network application server 5 having a speech interface provides an ASD file to the WTA server 7, along with a basic WML card deck, i.e. WML document, for that service. The WTA server 7 loads the ASD file and may change the WML sent to the mobile station 1 based on the ASD file settings. Based on the ASD file, audio functions of the mobile station 1 and settings of the ASR server 6 are controlled in dependence on the application context.

In the present example, the ASD file may define attributes such as an ASR engine to be used for an actual application, an encoding type supported by the ASR engine used by the actual speech-enabled application, a default grammar file (file name) to be used, a default vocabulary (file name or words) and states of the actual application, i.e. a menu hierarchy. Each menu provides specifications for commands supported at the menu and corresponding NEXT states, new grammar rules and vocabularies, which may override previously set values, and parameters specifying whether the actual application requires a microphone or a speaker of the mobile station 1 to be on or off.

In the following, the operation of the present WAP-based example will be described based on a weather service application and a voice mail service application.

WEATHER SERVICE APPLICATION

The service provider (or operator) provides a weather service to its mobile subscribers and offers the service over a speech interface. The operator has installed the ASR server 6 in his network 4 and intends to use this ASR server 6 along with the WTA server 7 to provide the weather service with a speech interface.

In this case, the user of the mobile station 1 activates a weather menu being already primed to use the speech interface. This request is sent by the WAE to the WTA server 7. Then, the WTA server 7 sends a deck of WML cards pre-loaded from the corresponding network application server 5 and relating to the weather service, to the mobile station 1. At this point, the WAE software of the mobile station 1 goes to a listening mode in order to answer an incoming call from the ASR server 6 of the network 4. Thereafter, the WTA server 7 sends a request for an ASR session to the ASR server 6, including an MSISDN, an allocated session ID with the WTA server 7, and also an ID of a grammar rule to be used. The grammar rule name is derived from the ASD file pre-loaded from the corresponding network application server 5 for the weather service.

The ASR server 6 ensures the required resources, i.e. dialout ports and ASR sessions on the speech engine, are available and sends a confirmation to the WTA server 7. Subsequently, the ASR server 6 calls the MSISDN and the network 4 sends a call indication to the mobile station 1. The WAE software of the mobile station 1 automatically answers the call and a speech connection is established between the ASR server 6 and the mobile station 1. Actually, the above call signaling between the mobile station 1 and the ASR server 6 is performed via the WTA server 7.

In accordance with the application-dependent WML obtained from the WTA server 7, the mobile station 1 deactivates its speaker and sends any audio input received via its microphone over the established speech connection. The audio input may be coded by the WAE software according to a required format, i.e. PCM, CEP or the like. The ASR server 6 converts the received audio input into text and sends the obtained text to the WTA server 7.

Since the weather session was started, the WTA server 7 has loaded the corresponding ASD file and is now in a position to compare the received text with the valid context-dependent commands. If a valid command, i.e. "London UK", has been received, the WTA server 7 requests the WML/HTML for London UK from the network application server 5 providing the weather service. The network application server 5 responds with the requested weather report for London and the WTA server 7 supplies the WML card deck for London weather to the mobile station 1. In case the grammar rules or vocabulary is changed in the set of WML cards, the ASD file contains a corresponding information and the WTA server 7 sends the new grammar rules or vocabulary to be used for the London weather to the ASR server 6. Thus, the ASR server 6 is primed to use the new grammar or vocabulary required for the new WML cards.

Thereafter, the text converted by the ASR server 6 from the speech commands received from the mobile station 1 is sent to the WTA server 7 which checks its validity. In case a valid command, i.e. "Heathrow", has been received, the WTA server 7 requests the weather info for London Heathrow, and the network application server 5 responds with the requested weather report. Then, the WML card deck for London Heathrow weather is supplied by the WTA server 7 to the mobile station 1.

VOICE MAIL SERVICE APPLICATION

In this case, the service provider (or operator) provides a voice mail service with a speech interface to its mobile subscribers.

The network application server 5 providing the voice mail service sends a new voice mail message to the WTA server 7. Then, the WTA server sends a deck of WML cards pre-loaded from the network application server 5 and relating to the voice mail service to the mobile station 1. At this point, the WAE software of the mobile station 1 goes to a listening mode in order to answer an incoming call from the ASR server 6 of the network 4. Then, the mobile station 1 sends to the WTA server 7 an ASR request which indicates that the user will employ the speech interface to the voice mail service. At this point, the WTA server 7 instructs the network 4 to send any incoming call indications to the WTA server 7.

Thereafter, the WTA server 7 sends a request for an ASR session to the ASR server 6, including and MSISDN, an allocated session ID with the WTA server 7, and also an ID of a grammar rule to be used. The grammar rule name is derived from the ASD file pre-loaded from the corresponding network application server 5 for the voice mail service.

The ASR server 6 ensures the required resources, i.e. dialout ports and ASR sessions on the speech engine, are available and sends a confirmation to the WTA server 7.

Subsequently, the ASR server 6 calls the MSISDN and the network 4 sends a call indication to the mobile station 1. The WAE software of the mobile station 1 automatically answers the call and a speech connection is established between the ASR server 6 and the mobile station 1.

In accordance with the application-dependent WML obtained from the WTA server 7, the mobile station 1 activates both its speaker and its microphone, and sends any audio input received via its microphone over the established speech connection. The audio input may be coded by the WAE software according to a required format, i.e. PCM, CEP or the like. The ASR server 6 converts the received audio input into text.

Now, the WTA server 7 sends a command to call the given MSISDN to the network application server 5 providing the voice mail service, which then calls the MSISDN. In this case, a multiparty call is setup, since the ASR server 6 requires a speech input at the mobile station 1 and the network application server 5 needs to send audio to the mobile station 1. These two services are in different machines and may not have any API (Application Programming Interface) or connection with each other. Since both servers need to access the mobile station 1, a multiparty call setup is required, which is explained in the following.

In the multiparty call setup, the WTA server 7 receives a call indication for the MSISDN and sends a call indication event message to the mobile station 1 with special parameters to instruct an addition of the call to a multiparty call. The mobile station 1 sends a call hold message to instruct the network 4 to hold call 1, i.e. the call from the ASR server 6 to the mobile station 1. Then, the mobile station 1 accepts call 2, i.e. the call from the network application server 5 to the mobile station 1, and a speech connection is established. Thereafter, the mobile station 1 instructs the establishment of a multiparty call, i.e. with call 1 and 2, such that now both the ASR server 6 and the network application server 5 are connected to the mobile station 1.

Since the voice mail session was started, the WTA server 7 has loaded the corresponding ASD file for voice mail and is now in a position to compare the received text with the valid context-dependent commands. If a valid command, i.e. "Anthony", has been received, the WTA server 7 requests the network application server 5 providing the voice mail service to play the message "Anthony". Accordingly, the network application server 5 performs playback of the message "Anthony".

It should be understood that the above description and the accompanying drawings are only intended to illustrate the present invention. In particular, the present invention is not restricted to speech recognition or control systems for mobile phones, but can be used in any data network. Thus, the apparatus and method according to the invention may vary within the scope of the attached claims.

A speech control system and method is described, wherein a state definition information is loaded from a network application server. The state definition information defines possible states of the network application server and is used for determining a set of valid commands of the network application server, such that a validity of a text command obtained by converting an input speech command can be checked by comparing said text command with said determined set of valid commands. Thereby, a transmission of erroneous text commands to the network application server can be prevented so as to reduce total processing time and response delays.

The invention claimed is:

1. Speech control system for a telecommunication network, comprising:
   loading means for loading a state definition information from a network application server in a single step, wherein said state definition information defines all possible states of the network application server and wherein said state definition information is based on context-dependent grammar files;
   determining means for determining a set of valid commands for said network application server on the basis of said state definition information; and
   checking means for checking a validity of a text command, obtained by converting an input speech command to be used for controlling said network application server, by comparing said text command with said determined set of valid commands.

2. System according to claim 1, wherein said loading means is arranged to load a grammar and/or vocabulary information which specifies a total set of valid commands supported by said network application server, wherein said determining means is arranged to determine said set of valid commands on the basis of said total set of valid commands and a state transition information included in said state definition information.

3. System according to claim 1, wherein said determining means is arranged to cause said loading means to load a state-dependent grammar file defining a set of valid commands for a specific state of the network application server, when said determining means determines a state change on the basis of a state transition information included in said state definition information.

4. System according to claim 3, wherein said state definition information includes a load instruction for loading the state-dependent grammar file.

5. System according to claim 1, wherein said telecommunication network is a mobile network and said speech control system is implemented in a Wireless Telephony Application (WTA) server, and wherein said WTA server is arranged to receive said text command from a network speech recognition means for converting an input speech command received from a subscriber terminal into said text command.

6. System according to claim 1, wherein said speech control system comprises a subscriber terminal having an input means for inputting a speech command, a transmitting means for transmitting said speech command to a speech recognition means of said telecommunication network, and a receiving means for receiving said text command from the speech recognition means, wherein said transmitting means is arranged to transmit the received text command to said network application server.

7. System according to claim 1, wherein said state definition information is provided by said network application server at a setup time.

8. System according to claim 1, wherein said state definition information is a data file.

9. System according to claim 8, wherein said data file is a WML file.

10. System according to claim 9, wherein said data file is sent on-line to said speech control system as a part of a standard information sent by said network application server.

11. System according to claim 8, wherein said data file is a HTML file.

12. System according to claim 1, wherein said speech control system comprises a speech recognition means for converting an input speech command received from a subscriber terminal into said text command to be supplied to said network application server.

13. System according to claim 12 wherein said state definition information is stored together with a command set information in a network server running on a hardware of said speech control system.

14. System according to claim 12 wherein said speech control system comprises a plurality of vendor-specific speech recognition means, and wherein corresponding parameters of said plurality of vendor-specific speech recognition means are defined in said state definition information.

15. Speech control method for a telecommunication network, comprising the steps of:
   loading a state definition information from a network application in a single step, wherein said state definition information defines all possible states of said network application and wherein said state definition information is based on context-dependent grammar files;
   determining a set of valid commands for said network application on the basis of said state definition information; and
   checking a validity of a text command, obtained by converting speech command, to be used for controlling said network application of a device or a server, by comparing said text command with said determined set of valid commands.

16. Method according to claim 15, further comprising the steps of loading a grammar and/or vocabulary information which specifies a total set of valid commands for said network application, wherein said determining step is performed on the basis of said total set of valid commands and a state transition information included in said state definition information.

17. Method according to claim 15, further comprising the step of loading a state-dependent grammar file defining a set of valid commands for a specific state of said network application, when a state change has been determined on the basis of the state transition information included in said state definition information.

18. Speech control system for a telecommunication network, comprising:
   a loading unit configured to load a state definition information from a network application server in a single step, wherein said state definition information defines all possible states of the network application server and wherein said state definition information is based on context-dependent grammar files;
   a determining unit configured to determine a set of valid commands for said network application server on the basis of said state definition information; and a checking unit configured to check a validity of a text command, obtained by converting an input speech command to be used for controlling said network application server, by comparing said text command with said determined set of valid commands.

19. System according to claim 18, wherein said loading unit is arranged to load a grammar and/or vocabulary information which specifies a total set of valid commands supported by said network application server, wherein said determining unit is arranged to determine said set of valid commands on the basis of said total set of valid commands and a state transition information included in said state definition information.

20. System according to claim 18, wherein said determining unit is arranged to cause said loading unit to load a state-dependent grammar file defining a set of valid commands for a specific state of the network application server, when said determining unit determines a state change on the basis of a state transition information included in said state definition information.

\* \* \* \* \*